(12) United States Patent
Yano

(10) Patent No.: US 7,345,773 B2
(45) Date of Patent: Mar. 18, 2008

(54) MOVABLE-TYPE FLATNESS MEASUREMENT APPARATUS

(75) Inventor: Katsuhiro Yano, Kumamoto (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 11/247,247

(22) Filed: Oct. 12, 2005

(65) Prior Publication Data

US 2006/0085994 A1 Apr. 27, 2006

(30) Foreign Application Priority Data

Oct. 25, 2004 (JP) .............................. 2004-310160

(51) Int. Cl.
*G01B 5/20* (2006.01)
*G01B 11/30* (2006.01)

(52) U.S. Cl. ...................... 356/628; 356/601; 356/614; 356/243.1; 33/533; 33/551; 33/553; 33/554; 33/555

(58) Field of Classification Search ................ 356/601, 356/237.1–237.3, 600, 614, 243.1, 628, 371; 33/533, 551, 553–555

See application file for complete search history.

(56) References Cited

U.S. PATENT DOCUMENTS

| 5,838,447 A * | 11/1998 | Hiyama et al. ............. 356/600 |
| 6,052,191 A * | 4/2000 | Brayden et al. ............ 356/630 |
| 6,603,589 B2 * | 8/2003 | Karin et al. ................. 359/212 |
| 6,739,945 B2 * | 5/2004 | Halley et al. ................. 451/6 |
| 6,791,686 B1 * | 9/2004 | Finarov ....................... 356/399 |
| 6,798,513 B2 * | 9/2004 | Abraham ..................... 356/369 |
| 6,811,466 B1 * | 11/2004 | Swedek et al. ................ 451/5 |
| 6,954,267 B2 * | 10/2005 | Abraham et al. ........ 356/237.2 |
| 2002/0083607 A1 * | 7/2002 | Atsuhiko et al. ............. 33/553 |
| 2004/0105099 A1 * | 6/2004 | Nikoonahad ................ 356/601 |

FOREIGN PATENT DOCUMENTS

JP  2001-91234  4/2001
JP  2003-075147  3/2003

* cited by examiner

*Primary Examiner*—Layla G. Lauchman
*Assistant Examiner*—Rebecca C. Slomski
(74) *Attorney, Agent, or Firm*—Young & Thompson

(57) ABSTRACT

In a flatness measurement apparatus, a sensor unit having a flatness-detection sensor is slidable along the linear guide rail. A support system supports the linear guide rail such that the linear guide rail is rotatable in a horizontal plane, whereby a surface of a wafer stage to be measured is scanned all over with the sensor unit having the flatness-detection sensor so as to ensure a flatness measurement of the whole surface of the wafer stage.

14 Claims, 7 Drawing Sheets

MOVABLE-TYPE FLATNESS MEASUREMENT APPARATUS

BACKGROUND OF THE INVENTION

1. Field of the Invention

The present invention relates to a flatness measurement apparatus for measuring a flatness of a surface of an object.

2. Description of the Related Art

For example, it is necessary to periodically measure a flatness of a wafer stage, containing a heater therein, which is installed in a closed vessel defining a vacuum or processing chamber of a chemical vapor deposition (CVD) apparatus. Whenever the flatness measurement of the wafer stage is carried out, the closed vessel is dismantled so that the wafer stage is taken out of the closed vessel, and then the wafer stage is set in a flatness measurement apparatus for the flatness measurement of the wafer stage. When the measured flatness of the wafer stage is acceptable, it is again assembled in the closed vessel. It takes approximately five or six hours for the dismantlement of the closed vessel to take out of the wafer stage therefrom, and thus there is a demand for a movable-type flatness measurement apparatus which is constituted such that a flatness measurement for the wafer stage can be carried out fast without taking the wafer stage out of the closed vessel.

Conventionally, the flatness measurement apparatus is constructed as an immovable-type flatness measurement apparatus, which is fixedly installed on a base or table on a floor. Usually, this immovable-type flatness measurement apparatus includes a stand on which an object to be measured is placed; and an X-Y stage on which a flatness-detection sensor is mounted. The X-Y stage is moved along an X-axis and Y-axis perpendicularly intersecting with each other, so that a surface of the object can be scanned all over with the flatness-detection sensor, whereby a flatness of the surface of the object can be measured. The X-Y stage occupies a large space due to the movement of the X-Y stage along-both the X-axis and the Y-axis, resulting in a bulkiness of the whole of the immovable-type flatness measurement apparatus.

In particular, for example, an extent of the movement of the X-Y stage along the X-axis must be from 1.3 to 1.5 times a maximum dimension of the object which should be scanned with the flatness-detection sensor along the X-axis. This is true for an extent of the movement of the X-Y stage along the Y-axis. Namely, the X-Y stage is very bulky. Thus, it is inexpedient to reconstitute this immovable-type flatness measurement apparatus as a movable-type flatness measurement apparatus is due to the bulkiness of the X-Y stage.

JP-A-2003-075147 discloses a second prior art immovable-type flatness measurement apparatus for simultaneously measuring flatnesses of both surfaces of a silicon wafer, and includes three needle-like supports for supporting the silicon wafer. Namely, the silicon wafer rests on the tips of the three needle-like supports. Also, this second prior art immovable-type flatness measurement apparatus includes a lifting/rotating mechanism for lifting and rotating the silicon wafer, and a pair of upper and lower flatness-detection sensors, which are held so as to be opposed to each other, with the silicon wafer being intervened between the upper and lower flatness-detection sensors.

In a flatness measurement, the silicon wafer is scanned with the upper and lower flatness-detection sensors by diametrically moving these sensors with respect to the silicon wafer, and thus flatnesses of both the surfaces of the silicon wafer are simultaneously measured along a diameter of the silicon wafer. Then, by using the wafer lifting/rotating mechanism, the silicon wafer is lifted from the tips of the needle-like supports, and is rotated by a predetermined angle. After the rotation of the silicon wafer by the predetermined angle, the silicon wafer again rests on the tips of the three needle-like supports. Subsequently, the silicon wafer is further scanned with the upper and lower flatness-detection sensors by diametrically moving them with respect to the silicon wafer, and flatnesses of both the surfaces of the silicon wafer are simultaneously measured along another diameter of the silicon wafer.

These diametrical flatness measurements are repeated whenever the silicon wafer is lifted and rotated by the wafer lifting/rotating mechanism, whereby both the surfaces of the silicon wafer can be scanned all over with the upper and flatness-detection sensor, whereby flatnesses of both the surfaces of the object can be measured.

By using the second prior art flatness measurement apparatus, it is impossible to carry out the flatness measurement of an installed object, e.g. the wafer stage installed in the vacuum or processing chamber of the CVD apparatus. Also, it is inexpedient to reconstitute the second prior art immovable-type flatness measurement apparatus as a movable-type flatness measurement apparatus due to a bulkiness of the wafer lifting/rotating mechanism.

SUMMARY OF THE INVENTION

Therefore, an object of the present invention is to provide a movable-type flatness measurement apparatus which is compactly constituted so that a flatness of an installed object can be measured.

In accordance with the present invention, there is provided a movable-type flatness measurement apparatus which comprises a linear guide rail, and a sensor unit containing a flatness-detection sensor, the sensor unit being slidable along the linear guide rail. The apparatus further comprises a support system that supports the linear guide rail such that the linear guide rail is rotatable in a horizontal plane, whereby a surface of an object to be measured is scanned all over with the sensor unit having the flatness-detection sensor.

In the flatness measurement apparatus according to the present invention, the support system may be constituted so as to be detachably mounted on the object, whereby the flatness measurement apparatus is defined as a movable type apparatus. Also, the support system may be constituted so as to be detachably mounted on a stage, on which the objected is placed, whereby the flatness measurement apparatus is defined as a movable type apparatus.

Preferably, the support system includes an outer annular flange adapted to be positioned at a proper posture with respect to the object, and an inner annular flange associated with the outer annular flange so as to be rotatable with respect to the outer annular flange, the linear guide rail being securely mounted on the inner annular flange.

The support system may further include a ring-like bearing intervened between the outer and inner annular flanges, to thereby ensure the rotatable association therebetween.

Preferably, the outer annular flange may have a peripheral recess which is formed along an inner periphery of a bottom thereof such that an outer peripheral edge portion of the object fittingly received in the peripheral recess to thereby ensure the positioning of the flatness measurement apparatus at the proper posture with respect to the object.

Alternatively, the outer annular flange may have a peripheral recess which is formed along an inner periphery of a bottom thereof such that an outer peripheral edge portion of a stage, on which the object is placed, fittingly received in the peripheral recess to thereby ensure the positioning of the flatness measurement apparatus at the proper posture with respect to the object.

The outer annular flange may have an angular scale formed thereon, to thereby identify an angular position of the inner annular flange with respect to the outer annular flange. Also, the linear guide rail may have a linear scale formed thereon, to thereby identify a linear position of the sensor unit along the linear guide rail.

BRIEF DESCRIPTION OF THE DRAWINGS

The above object and other objects will be more clearly understood from the description set forth below, with reference to the accompanying drawings, wherein.

DESCRIPTION OF THE PREFERRED EMBODIMENTS

Figure 1:
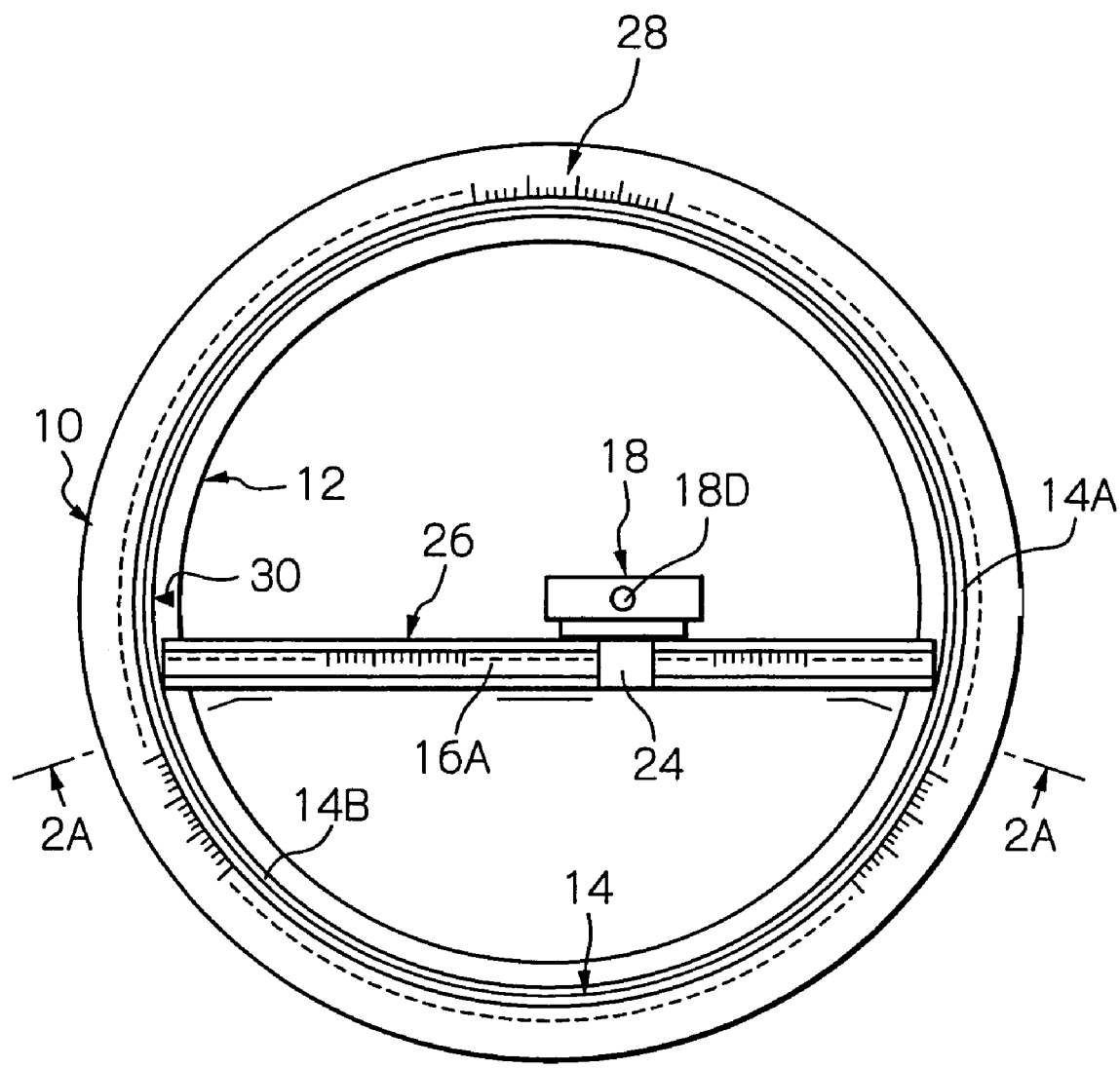
FIG. 1 is a plan view of an embodiment of a movable-type flatness measurement apparatus according to the present invention.
Figure 2A:
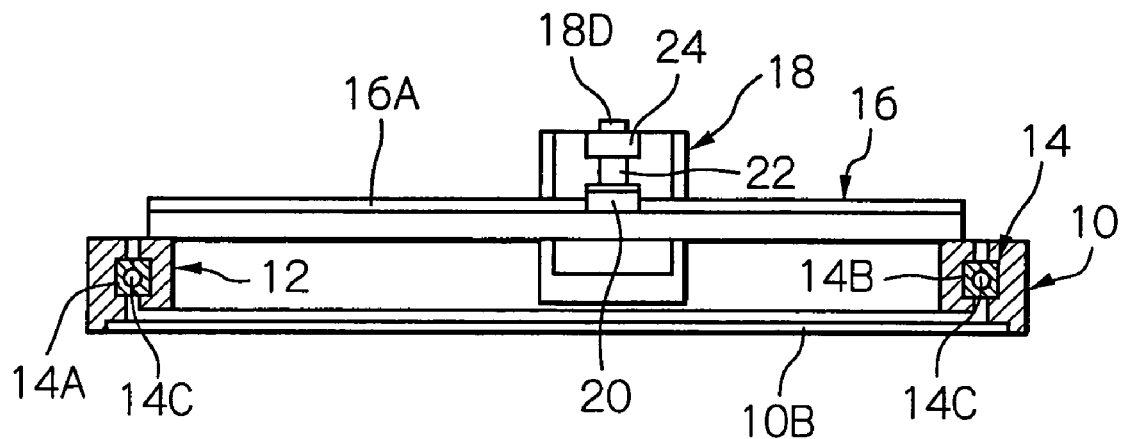
FIG. 2A is a cross-sectional view taken along the 2A-2A line of FIG. 1.
Figure 2B:
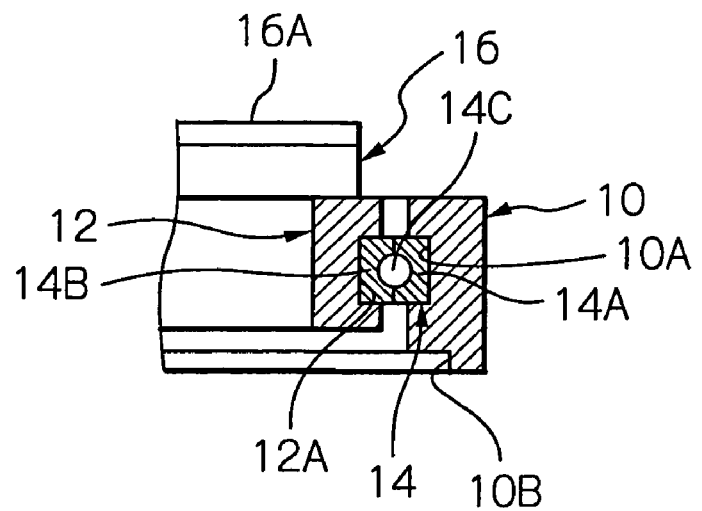
FIG. 2B is a partially-enlarged view of FIG. 2A.

With reference to FIGS. 1, 2A and 2B, an embodiment of a movable-type flatness measurement apparatus according to the present invention will be now explained below.

The movable-type flatness measurement apparatus includes an outer annular flange 10, an inner annular flange 12, and an annular ball bearing 14 provided therebetween such is that the outer and inner annular flanges 10 and 12 are rotatable with respect to each other, as shown in FIGS. 1, 2A, and 2B.

In particular, the ring-like ball bearing 14 includes an outer race 14A, an inner race 14B, a plurality of balls 14C received therebetween. As best shown in FIG. 2B, The outer annular flange 10 is formed with an inner annular groove 10A along the inner wall thereof, and the outer race 14A is securely fixed in the inner annular groove 10A of the outer annular flange 10. Similarly, the inner annular flange 12 is formed with an outer annular groove 12A along the outer wall thereof, and the inner race 14B is securely fixed in the outer annular groove 12A of the inner annular flange 12. With this arrangement, the outer and inner annular flanges 10 and 12 can be rotated with respect to each other due to the ring-like ball bearing 14 provided therebetween.

The flatness measurement apparatus also includes a linear guide rail 16 securely mounted on the annular inner flange 12 so as to span the same, and a sensor unit 18 suspended from the linear guide rail 16 so as to move along the same. In particular, the linear guide rail 16 has an elongated ridge-like rail portion 16A integrally formed thereon, and the sensor unit 18 has a slide shoe 20 slidably engaged with the ridge-like rail portion 16A, an upright stem 22 securely mounted on to a top of the slide shoe, and an attachment block 24 to which the sensor unit 18 is securely attached. With this arrangement, it is possible to move the sensor unit 18 along the linear guide rail 16.

As is apparent from FIG. 1, the linear guide rail 16 spans the inner flange 12 so as to be somewhat departed from the center of the inner annular flange 12, so that the sensor unit 18 is moved along a diameter of the inner annular flange 12.

As shown in FIG. 1, a linear scale, generally indicated by reference 26, is formed on the ridge-like rail portion 16A of the linear guide rail 16, and the sensor unit 18 has an index (not shown) associated with the scale 26, whereby it is possible to identify a position of the sensor, unit 18 along the linear guide rail 16.

Also, as shown in FIG. 1, an angular scale, generally indicated by reference 28, is formed on the outer annular flange 10, and the inner annular flange 12 has an index 30 formed thereon and associated with the angular scale 28, whereby it is possible to identify a rotational position of the inner annular flange 12 with respect to the outer annular flange 10.

Figure 3:
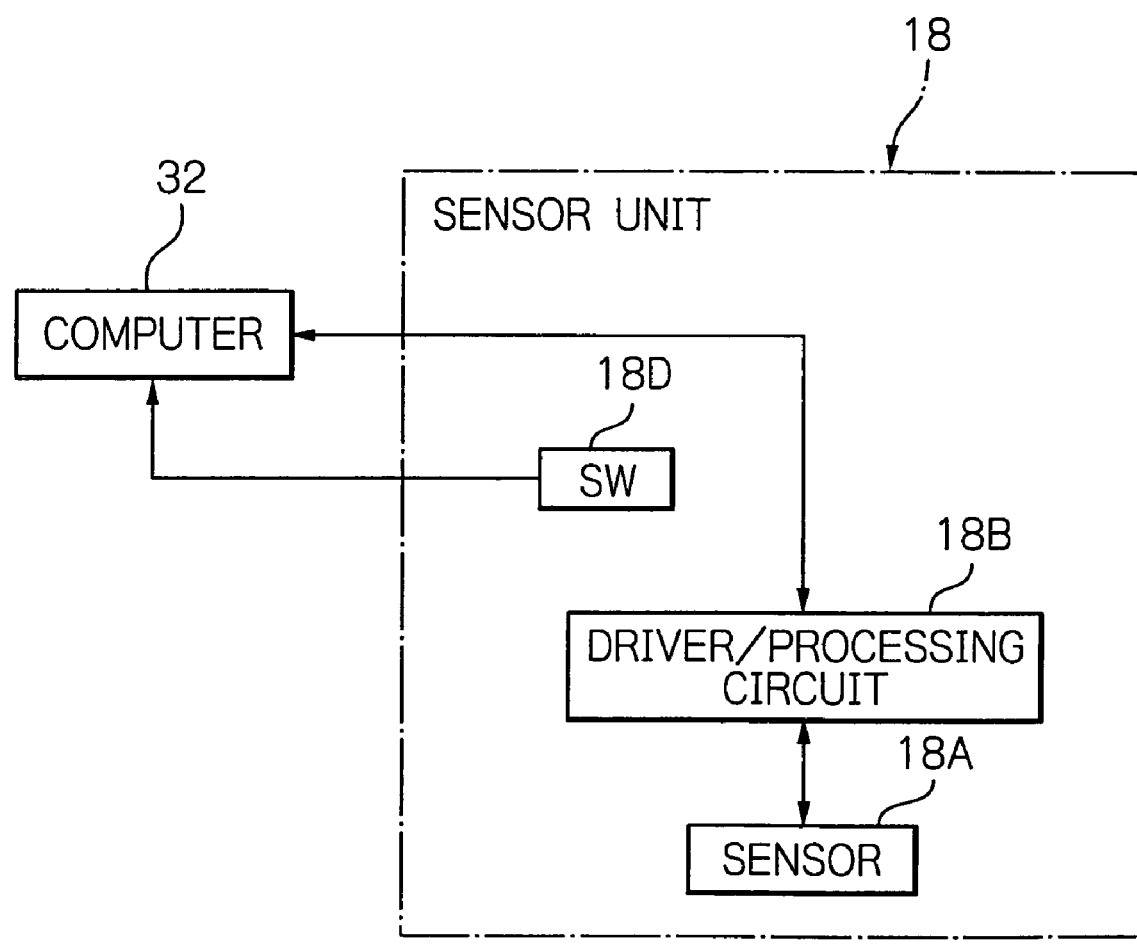
FIG. 3 is a block diagram of a sensor unit shown in FIGS. 1 and 2A.

As shown in FIG. 3, the sensor unit 18 contains a flatness-detection sensor 18A which is formed as a noncontact type sensor, such as a laser displacement type sensor, an electrostatic capacitance displacement type sensor or the like. The sensor unit 18 also includes a driver/processing circuit 18B connected to the flatness-detection sensor 18A, and the driver/processing circuit 18B is connected to a computer 32, which is not shown in FIGS. 1 and 2A. The driver/processing circuit 18B is operated under control of the computer 32 to drive the flatness-detection sensor 18A.

The sensor unit 18 further includes a sampling switch 18C, which is operated by depressing a switch button 18D provided in a top wall of the sensor unit 18, as shown in FIGS. 1 and 2A. Whenever the switch button 18D is depressed to thereby operate the sampling switch 18C, a sampling signal is output from the sampling switch 18C to the computer 32. When the computer 32 receives the sampling signal, it fetches flatness data detected by the flatness-detection sensor 18A.

Figure 4:
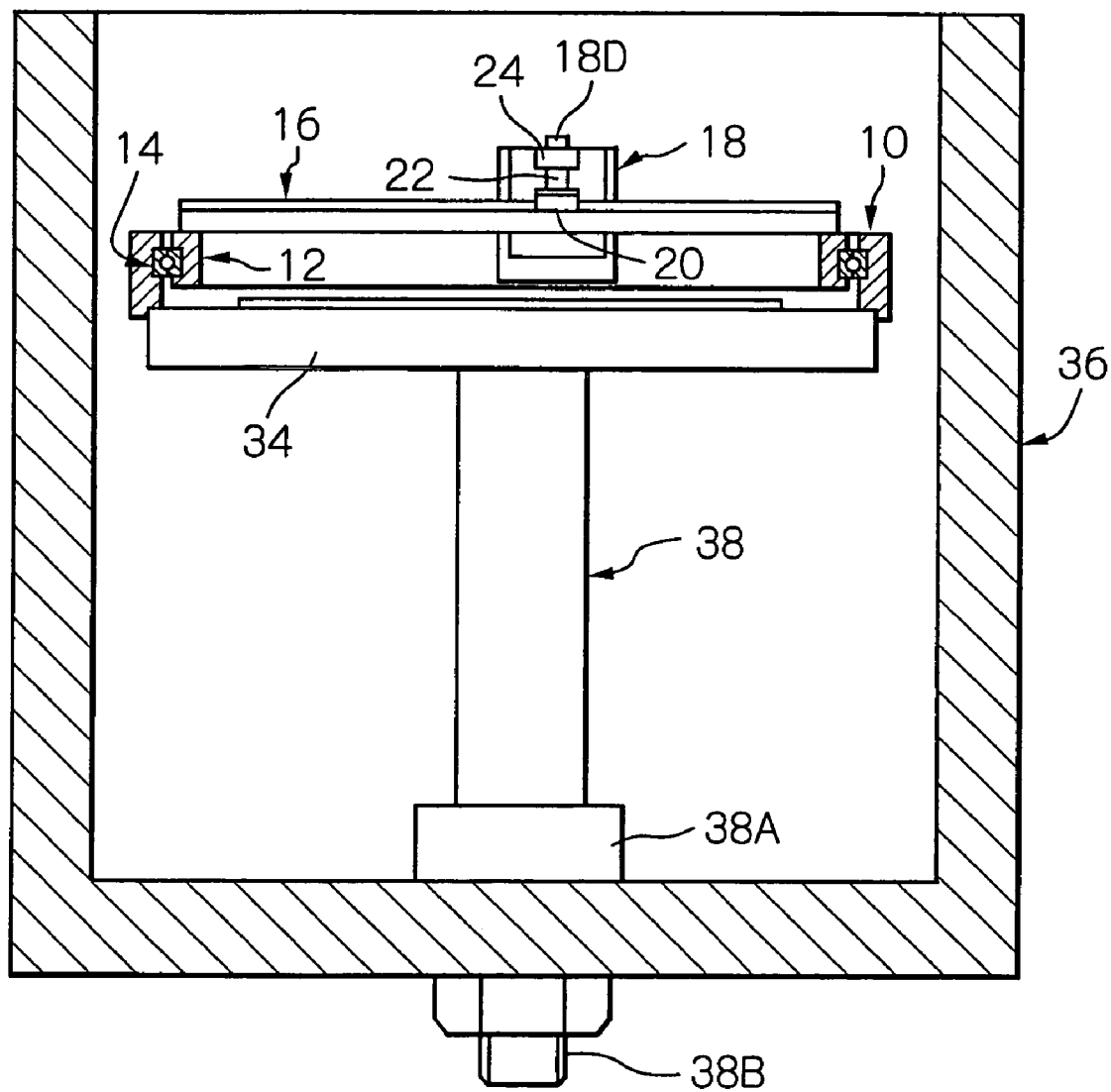
FIG. 4 is a partially-cross-sectional view of a closed vessel defining a vacuum or processing chamber of a chemical vapor deposition (CVD) apparatus, a lid for closing the closed vessel being removed, the movable-type flatness measurement apparatus being detachably mounted on a wafer stage installed in the closed vessel.

As is apparent from FIG. 4, in this embodiment, the flatness-measurement apparatus is constituted so as to measure a flatness of a wafer stage 34, containing a heater (not visible) therein, which is installed in a closed vessel 36 defining a vacuum or processing chamber of a chemical vapor deposition (CVD) apparatus.

As shown in FIG. 4, a top of the closed vessel 36 is opened by removing a lid (not shown) therefrom, and the movable-type flatness measurement apparatus is detachably mounted on the wafer stage 34 for the flatness measurement of the surface of the wafer stage 34. It is necessary to always mount the movable-type flatness measurement apparatus on the wafer stage at a proper posture with respect the wafer stage 34, before the flatness measurement of the surface of the wafer stage 34 can be properly carried out. To this end, as shown in FIGS. 2A and 2B, the outer annular flange 10 has an annular recess 10B, which is formed along an inner periphery of a bottom thereof such that an outer peripheral edge portion of the wafer stage 34 is fittingly received in the annular recess 10B.

Namely, when the movable-type flatness measurement apparatus is mounted on the wafer stage 34 so that the outer peripheral edge portion of the wafer stage 34 is completely and fittingly received in the annular recess 10B of the outer annular flange 10, the mounting of the movable-type flatness measurement apparatus on the wafer stage 34 at the proper posture is ensured.

As shown in FIG. 4, the wafer stage 34 is securely mounted on a support post 38 which uprightly stands from the bottom of the closed vessel 36. In particular, the support post 38 has a flange 38A, and a threaded portion 36B extending downward from the flange 38A. The threaded portion 38B passes through the bottom of the closed vessel 36, and the support post 38 is securely fastened to the bottom of the closed vessel 36 by tightening a nut 38C onto the threaded portion 38.

Figure 5:
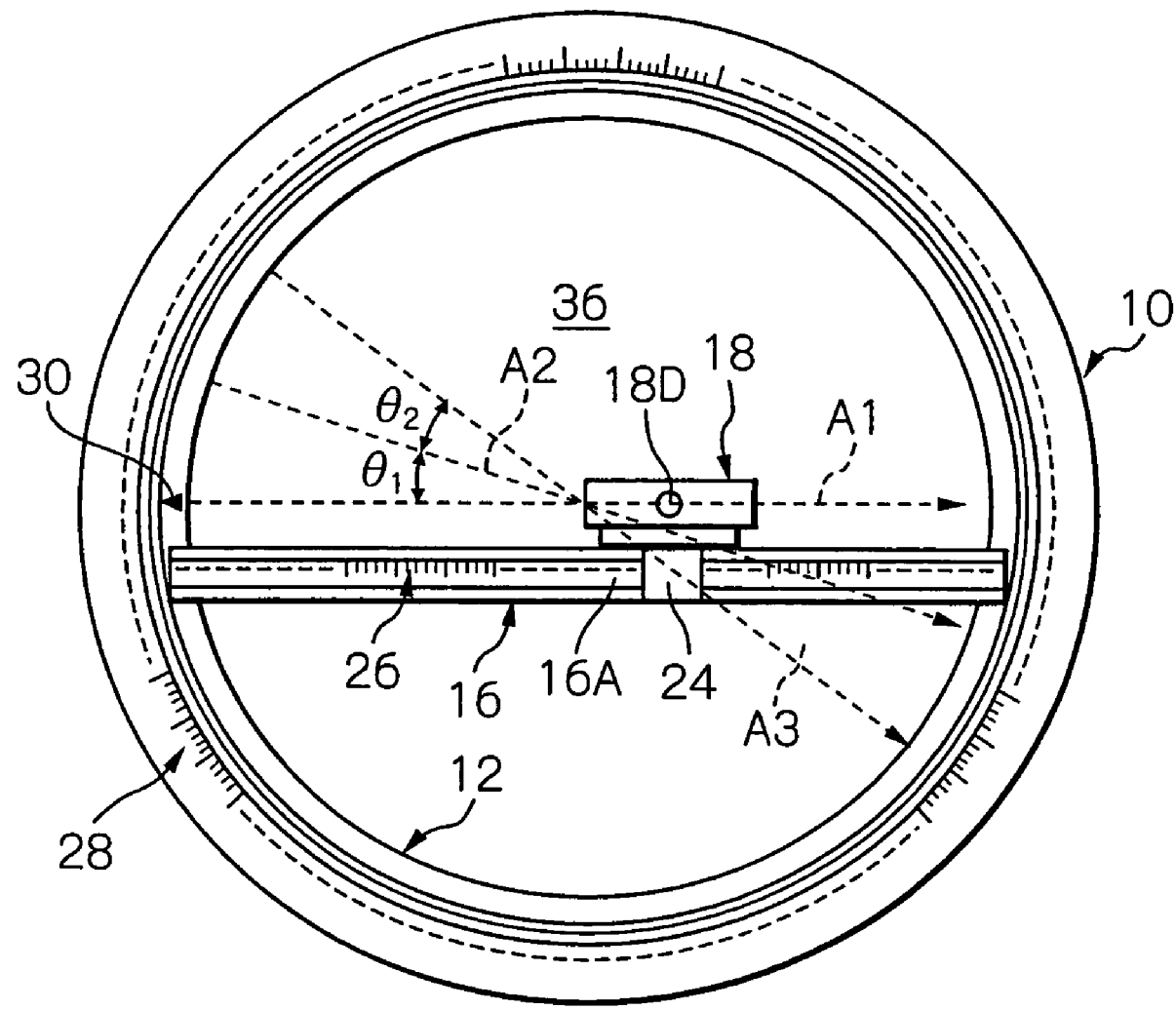
FIG. 5 is a plan view, similar to FIG. 1, of the movable-type flatness measurement apparatus mounted on the wafer stage shown in FIG. 4.

With reference to FIG. 5, a flatness measurement procedure for measuring the surface of the wafer stage 34 will be now explained below.

After the movable-type flatness measurement apparatus is mounted on the wafer stage 34, as shown in FIG. 4, by manually rotating the inner annular flange 12 with respect to the outer annular flange 10, the inner annular flange 12 is positioned at a suitable initial position, using the angular scale 28 and the index 30. Then, the sensor unit 18 is manually moved along the linear guide rail 16 from one end of the linear guide rail 16 toward the other end thereof, as indicated by a broken arrow A1 in FIG. 4.

During the movement of the sensor unit 18 along the line of the broken arrow A1, the sensor unit 18 is stopped at each of predetermined sampling points, using the linear scale 26 and the index (not shown). Whenever the sensor unit 18 is stopped at each of the predetermined sampling points, the switch button 10D is manually depressed to thereby output a sampling signal from the sampling switch 18C to the computer 32 (FIG. 3). Thus, whenever the computer 32 receives the sampling signal from the sampling switch 18C, it fetches flatness data detected by the flatness-detection sensor 18A.

After the flatness measurement is completed along the line of the broken arrow A1, the inner annular flange 12 is angularly rotated clockwise from the initial position by an angle of rotation of $\theta_1$, using the angular scale 28 and the index 30. Then, the sensor unit 18 is manually moved along the linear guide rail 16 from one end of the linear guide rail 16 toward the other end thereof, as indicated by a broken arrow A2 in FIG. 4.

During the movement of the sensor unit 18 along the line of the broken arrow A2, the sensor unit 18 is stopped at each of predetermined sampling points, using the linear scale 26 and the index (not shown). Whenever the sensor unit 18 is stopped at each of the predetermined sampling points, the switch button 10D is manually depressed to thereby output a sampling signal from the sampling switch 18C to the computer 32 (FIG. 3). Thus, whenever the computer 32 receives the sampling signal from the sampling switch 18C, it fetches flatness data detected by the flatness-detection sensor 18A.

After the flatness measurement is completed along the line of the broken arrow A2, the inner annular flange 12 is angularly rotated clockwise from the angular position ($\theta_1$) by an angle of rotation of $\theta_2$, using the angular scale 28 and the index 30. Then, the sensor unit 18 is manually moved along the linear guide rail 16 from one end of the linear guide rail 16 toward the other end thereof, as indicated by a broken arrow A3 in FIG. 4. The flatness measurement is carried out along the line of the broken arrow A3 in substantially the same manner as mentioned above.

Thus, by repeating the above-mentioned flatness measurement, the surface of the object is scanned all over with the flatness-detection sensor unit 18, whereby the flatness data, derived from the whole surface of the wafer stage 34, are fetched by and accumulated in the computer 32. The accumulated flatness data are processed in a well-known manner by the computer 32, resulting in completion of a flatness measurement on the whole surface of the wafer stage 36.

As is apparent from the foregoing, the outer and inner annular flanges 10 and 12 define a support system which supports the linear guide rail 16 such that the linear guide rail 16 is rotatable in a horizontal plane, and the sensor unit 18 is movable along the linear guide rail 16, whereby the surface of the wafer stage 32 is scanned all over with the sensor unit 18. Namely, although the movable-type flatness measurement apparatus according to the present invention is considerably compact, it is possible to ensure the flatness measurement of the whole surface of the wafer stage 32.

Since the movable-type flatness measurement apparatus inevitably involves inherent errors in the flatness measurement, it is necessary to previously prepare calibration data, which are obtained by actually measuring an object having a reference flatness surface. Namely, the calibration data are stored in a memory of the computer 32, and the flatness data obtained from the wafer stage 34 should be processed and calibrated by the calibration data before the flatness measurement on the whole surface of the wafer stage 36 can be precisely carried out.

As stated hereinbefore, conventionally, whenever the flatness measurement of the wafer stage 34 is carried out, the closed vessel 36 must be dismantled so that the wafer stage 34 is taken out of the closed vessel 36. Then, the wafer stage 34 is set in an immovable-type flatness measurement apparatus for the flatness measurement of the wafer stage 34 for the flatness measurement of the wafer stage 34. After the flatness measurement is completed, it must be again assembled in the closed vessel 36.

However, according to the present invention, it is possible to carry out the flatness measurement by merely removing the lid from the closed vessel 36 without taking the wafer stage 34 out of the closed vessel 36.

In the above-mentioned embodiment, although the movable-type flatness measurement apparatus is constituted so as to measure the flatness of the wafer stage 34, it may be used to measure a flatness of another object. For example, it is possible to measure a flatness of a silicon wafer by using the above-mentioned movable-type flatness measurement apparatus, as shown in FIG. 6.

In this drawing, reference 40 indicates a base stand which is used to measure the flatness of the silicon wafer, indicated by reference SW, by using the movable-type flatness measurement apparatus. The base stand 40 includes a base 40A placed on a floor (not shown), a support post 40B uprightly standing on the base 40A, and a circular stage 40C securely mounted on a top of the support post 40B, with the silicon wafer SW resting on the circular stage 40C.

Figure 6:
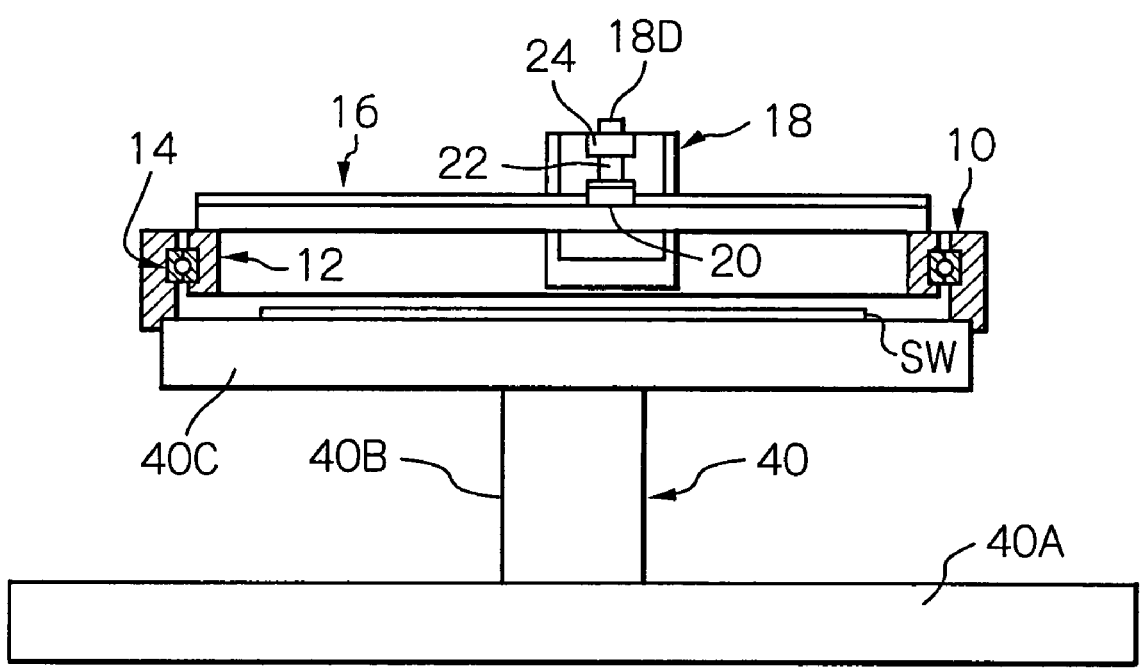
FIG. 6 is an elevational view of a base stand which is used to measure a flatness of a silicon wafer by using the movable-type flatness measurement apparatus.

The circular stage 40C has substantially the same configuration as the wafer stage 34 (FIG. 4), and thus it is possible to detachably mount the movable-type flatness measurement apparatus on the circular stage 40C at the proper posture, as shown in FIG. 6. Accordingly, the flatness measurement of the surface of the silicon wafer SW can be carried out in substantially the same manner as mentioned above.

Figure 7A:
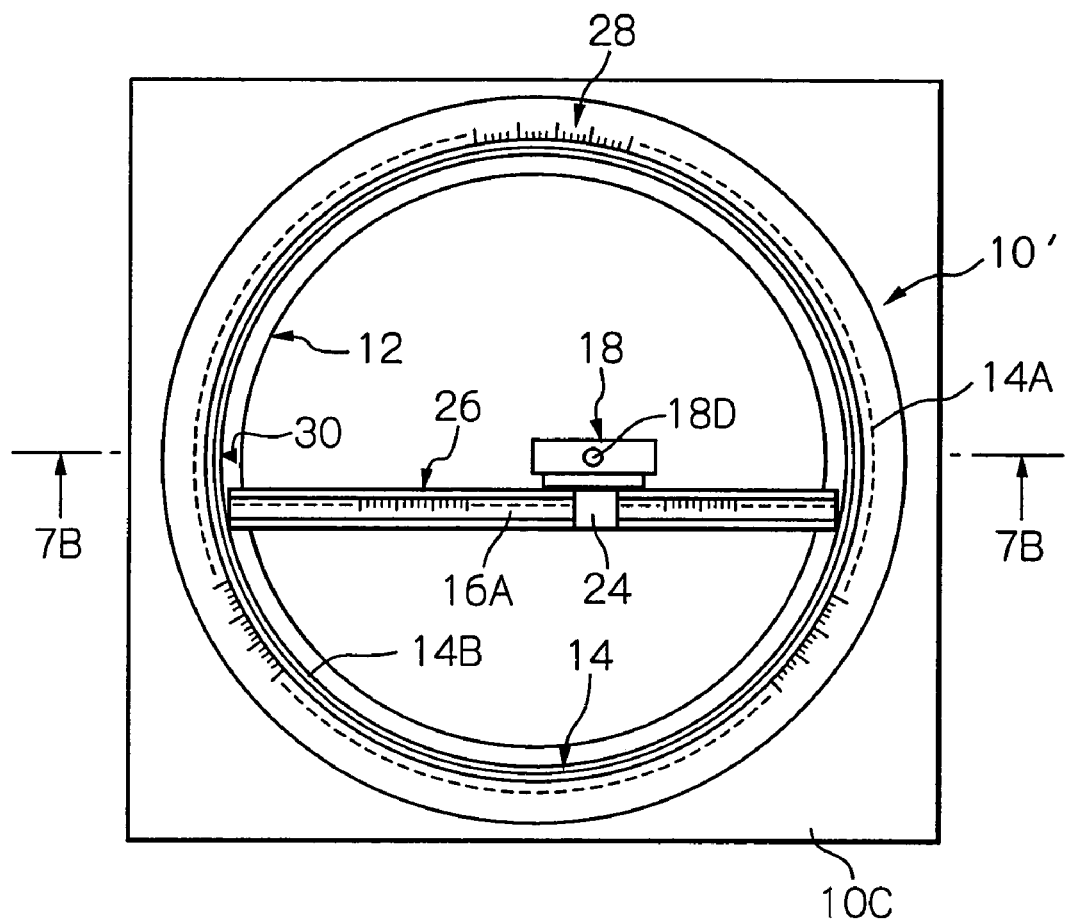
FIG. 7A is a plan view of a modification of the movable-type flatness measurement apparatus.
Figure 7B:
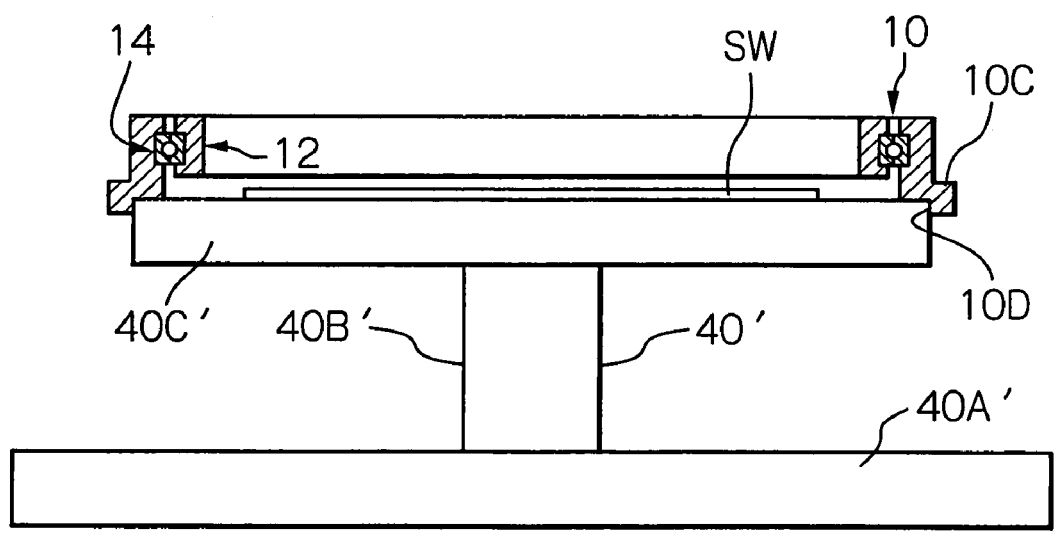
FIG. 7B is a cross-sectional view taken along the 7B-7B line of FIG. 7A.

FIGS. 7A and 7B show a modification of the above-mentioned movable flatness measurement apparatus. Note, in FIGS. 7A and 7B, the same references as in FIGS. 1 and 6 represents the same features, and like features bear like references primed.

In this modified movable flatness measurement apparatus, an outer annular flange 10' is formed in substantially the same manner as the outer annular flange 10 except that the outer annular flange 10' has a square extension 10C integrally extended outward from the bottom thereof. On the other hand, a base stand 40' includes a base. 40A' placed on a floor (not shown), a support post 40B' uprightly standing on the base 40A', and a square stage 40C' securely mounted on a top of the support post 40B', and the square extension 10C is configured so as to fittingly receive the square stage 40C' when the modified movable flatness measurement apparatus is mounted on the square extension 10C.

In particular, the square extension 10C has a square recess 10D, which is formed along an inner periphery of a bottom of the square extension 10C such that an outer square edge portion of the square stage 40C' is fittingly received in the square recess 10D. Thus, it is possible to always mount the modified movable-type flatness measurement apparatus on the square stage 40C' at a proper posture with respect the square stage 40C', whereby the flatness measurement of the surface of the silicon wafer SW can be properly carried out.

In the above-mentioned embodiments, although the sensor unit 18 is manually moved along the linear guide rail 16, it is possible to automatically carry out the movement of the sensor unit 18 by incorporating a suitable driving system in the sensor unit 18, if necessary. In this case, flatness data detected by the flatness-detection sensor 18A may be automatically fetched by the computer 32 at regular time intervals. Also, it is possible to automatically carry out the rotational movement of the inner annular flange 12 with respect to the outer annular flange 10 by associating a suitable driving system with the inner annular flange 12.

Finally, it will be understood by those skilled in the art that the foregoing description is of a preferred embodiment of the apparatus, and that various changes and modifications may be made to the present invention without departing from the spirit and scope thereof.

The invention claimed is:

1. A flatness measurement apparatus comprising:
a linear guide rail;
a sensor unit containing a flatness-detection sensor, said sensor unit being slidable along said linear guide rail; and
a support system that supports said linear guide rail such that said linear guide rail is rotatable in a horizontal plane, whereby a surface of an object to be measured is scanned with said sensor unit having the flatness-detection sensor,
wherein said support system includes an outer annular flange adapted to be positioned at a proper posture with respect to said object, and an inner annular flange associated with said outer annular flange so as to be rotatable with respect to said outer annular flange, said linear guide rail being securely mounted on said inner annular flange.

2. The flatness measurement apparatus as set forth in claim 1, wherein said support system is constituted so as to be detachably mounted on said object, whereby the flatness measurement apparatus is defined as a movable type apparatus.

3. The flatness measurement apparatus as set forth in claim 1, wherein said support system is constituted so as to be detachably mounted on a stage, on which the object is placed, whereby the flatness measurement apparatus is defined as a movable type apparatus.

4. The flatness measurement apparatus as set forth in claim 1, wherein said support system further includes a ring-like bearing intervened between said outer and inner annular flanges, to thereby ensure the rotatable association therebetween.

5. The flatness measurement apparatus as set forth in claim 1, wherein said outer annular flange has a peripheral recess which is formed along an inner periphery of a bottom thereof such that an outer peripheral edge portion of said object fittingly received in said peripheral recess to thereby ensure the positioning of said flatness measurement apparatus at the proper posture with respect to said object.

6. The flatness measurement apparatus as set forth in claim 1, wherein said outer annular flange has a peripheral recess which is formed along an inner periphery of a bottom thereof such that an outer peripheral edge portion of a stage, on which said object is placed, fittingly received in said peripheral recess to thereby ensure the positioning of said flatness measurement apparatus at the proper posture with respect to said object.

7. The flatness measurement apparatus as set forth in claim 1, wherein said outer annular flange has an angular scale formed thereon, to thereby identify an angular position of said inner annular flange with respect to said outer annular flange.

8. The flatness measurement apparatus as set forth in claim 1, wherein said linear guide rail has a linear scale formed thereon, to thereby identify a linear position of said sensor unit along said linear guide rail.

9. A flatness measurement apparatus comprising:
an outer annular member defining an interior space adapted to receive an object whose flatness is to be measured;
a linear guide rail that crosses said interior space;
a sensor unit containing a flatness-detection sensor, said sensor unit being slidable along said linear guide rail; and
a rotating support in said interior space that supports ends of said linear guide rail so that said linear guide rail is rotatable in a plane parallel to a plane of said outer annular member, whereby a surface of the object to be measured is scanned with said sensor unit having the flatness-detection sensor.

10. The apparatus of claim 9, wherein said linear guide rail is displaced from a center of said interior space so that said linear guide rail always avoids the center when said linear guide rail rotates.

11. The apparatus of claim 10, wherein said flatness-detection sensor is displaced from an axis of said linear guide rail and crosses the center of said interior space when said sensor unit slides along said linear guide rail.

12. The apparatus of claim 9, wherein said rotating support comprises an inner annular member whose external periphery is separated from an internal periphery of said outer annular member by a bearing so that said inner annular member is rotatable relative to said outer annular member.

13. The apparatus of claim 11, wherein said outer annular flange has an angular scale formed thereon, to thereby identify an angular position of said inner annular member with respect to said outer annular member.

14. The apparatus of claim 11, wherein said linear guide rail has a linear scale formed thereon, to thereby identify a linear position of said sensor unit along said linear guide rail.

* * * * *